US005615262A

United States Patent [19]
Guy et al.

[11] Patent Number: 5,615,262
[45] Date of Patent: Mar. 25, 1997

[54] DEVICE FOR SECURING AN INFORMATION SYSTEM USED IN MICROCOMPUTERS

[75] Inventors: Antoine Guy; Pierre Romenteau, both of Paris, France

[73] Assignee: Thomson-CSF, Paris, France

[21] Appl. No.: 352,857

[22] Filed: Dec. 2, 1994

[30] Foreign Application Priority Data

Dec. 3, 1993 [FR] France .................................. 93 14518

[51] Int. Cl.⁶ ............................................ H04L 9/00
[52] U.S. Cl. ................................... 380/4; 380/52
[58] Field of Search .................... 380/3, 4, 52, 49

[56] References Cited

U.S. PATENT DOCUMENTS

| | | | |
|---|---|---|---|
| 5,187,352 | 2/1993 | Blair et al. | 380/25 |
| 5,283,828 | 2/1994 | Sunders et al. | 380/4 |
| 5,388,156 | 2/1995 | Blackledge et al. | 380/4 |

FOREIGN PATENT DOCUMENTS

WO91/13403  9/1991  WIPO.

OTHER PUBLICATIONS

Marcellus Buchheit, Software–Kopierschutz, Elektronik, vol. 41, 7 Juillet 1992, Munchen De, pp. 68–74, (With French Translation).

Primary Examiner—David C. Cain
Attorney, Agent, or Firm—Oblon, Spivak, McClelland, Maier & Neustadt, P.C.

[57] ABSTRACT

A device for the securing of information systems, notably for a system used in the field of microcomputers, comprising at least one SCSI port having means for the enciphering of confidential information travelling through the system and comprising a peripheral communicating with the information system by an SCSI bus that has an interface between the SCSI bus and a bus internal to the peripheral, placing information management and storage means in a state of communication with the enciphering means contained in the peripheral as well as with an interface between a user and the peripheral, making it possible to provide the security services for the confidential information travelling through the peripheral, independently of the standards of the bus and operating system used by the information system.

6 Claims, 4 Drawing Sheets

DEVICE FOR SECURING AN INFORMATION SYSTEM USED IN MICROCOMPUTERS

BACKGROUND OF THE INVENTION

1. Field of the invention

The present invention relates to a device for securing information systems and, notably, to an information system used in microcomputers.

The field includes all the techniques and technologies applicable to protecting information elements stored, processed or transmitted on any medium of any kind.

The regulations relating to the security of information systems dictate the use of cryptographic resources, such as dedicated integrated circuits, to protect or encipher confidential information elements of a system with a level of protection that is acceptable in terms of what would be at stake if the security of the confidential information elements were to be compromised.

The enciphering resources that should be integrated into a microcomputer have to cope with the problem of the heterogeneity of the hardware and the speed with which the software elements are developing. This makes it necessary for the users of these enciphering resources to confine themselves to machines that very soon become obsolete.

2. Description of the Prior Art

In the case of a microcomputer, the enciphering integrated circuit is fitted into microprocessor-controlled cards. The enciphering circuit then behaves like a coprocessor. Using these cards, which are fitted into the internal bus of the microcomputer, and by the adding software primitives compatible with the operating system of the microcomputer, a certain number of security services, such as authentication, integrity checks, confidentiality, non-repudiation, etc., may be performed by relying on the use of the principles of cryptography.

At present, it is difficult to achieve the flexible integration of these cards into the microcomputer environment. Indeed, the standards pertaining to equipment and the standards pertaining to operating systems are very numerous. This variety makes it necessary to state and define the securing functions in the form of groups of cards that meet the different standards.

This results in high costs in terms of development and even higher costs in terms of maintenance, given the speed with which standards are changing in the field of microcomputers.

SUMMARY OF THE INVENTION

An object of the invention is to overcome the above-mentioned drawbacks.

In order to achieve the above objective, the present invention is implemented by a peripheral device for securing information systems, notably information systems used microcomputers. The peripheral device includes a bus internal to the peripheral device; an interface between the first SCSI bus and the bus internal to the peripheral device; enciphering means; information management and storage means for communicating with the enciphering means; and an interface between a user and the peripheral device, whereby the confidential information travels through the peripheral device independent of standards of a bus used by the information system and an operating system used by the information system.

One of the main advantages of the invention enables the usual security services to be provided independently of the standards of the bus and operating system of the information system. For this purpose, the invention moves the security resource out of the microcomputer and implements it as a standard computer peripheral with respect to the microcomputer. In the case of a microcomputer, the communication port most suited to the connection of the peripheral is the SCSI (Small Computer System Interface) port comprising a system for assigning and addressing different peripherals that emulate systems Connected to a local area network.

BRIEF DESCRIPTION OF THE DRAWINGS

Other features and advantages of the invention shall appear from the following description, made with reference to the appended drawings, of which.

MORE DETAILED DESCRIPTION

The peripheral device according to the present invention can be used on any microcomputer or workstation having an SCSI port. It can be used on database of local area networks by subscribers to these networks. It can also be used with a parallel interface on fax machines.

Another advantage of the device according to the invention is that, during non-working hours, the user can easily place his peripheral device under lock and key in a safe if his premises are not protected, and thus prevent the secret items contained in the peripheral from being compromised.

Figure 1:
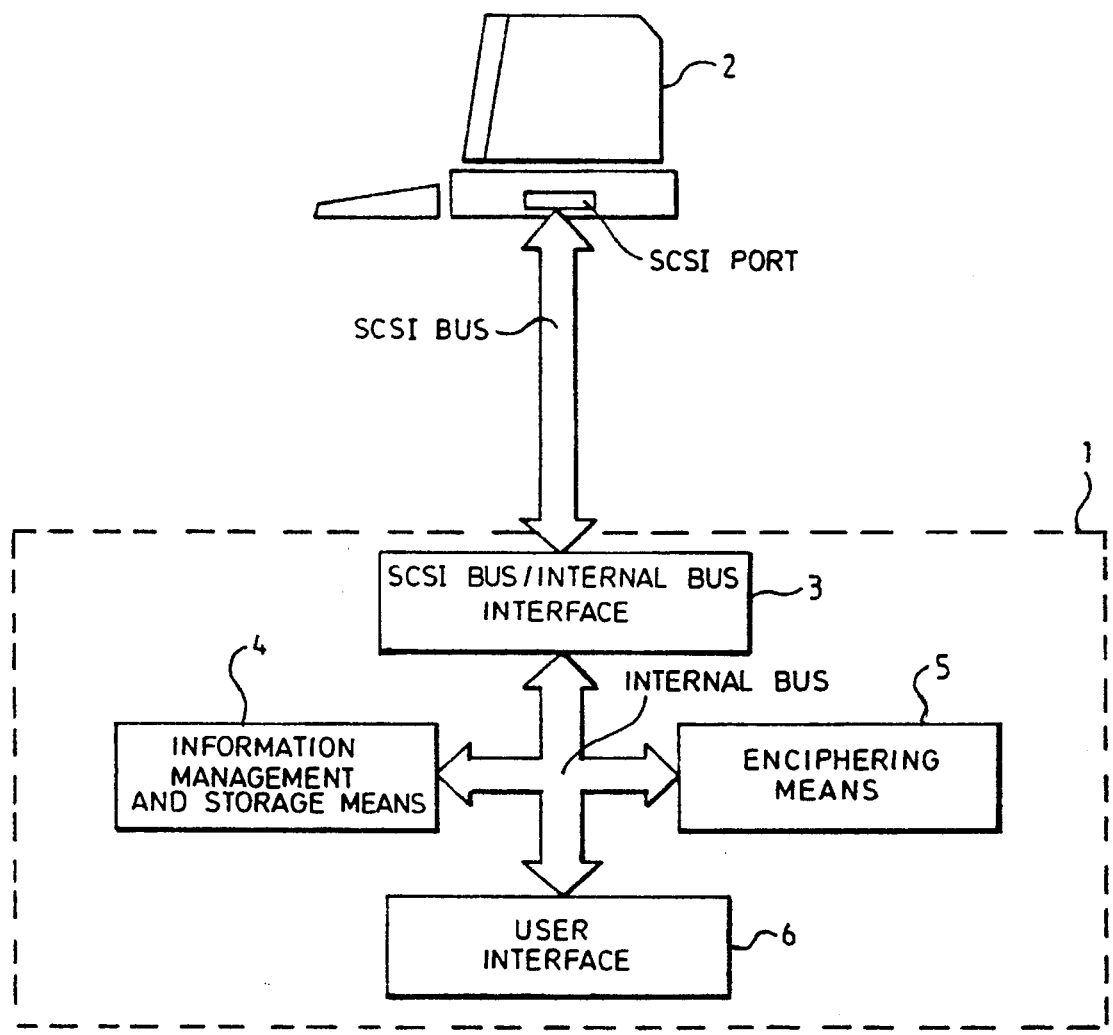
FIG. 1 shows a functional drawing of a device according to the invention.

FIG. 1 shows a functional diagram of a device according to the invention.

The device according to the invention is a peripheral device 1 demarcated by a closed line of dashes and it is connected to a microcomputer 2 by a first end of a two-way SCSI bus through the SCSI port of the microcomputer 2. The SCSI bus is connected by its other end to the input of the peripheral device 1 according to the invention by an interface 3 which lies between the SCSI bus and a bus internal to the peripheral device 1. This interface 3, for example a controller, enables the reception of instructions or commands coming from the microcomputer 2, the dispatching of the instructions or commands, and the transfer of the information elements with shaping of the signal received to the internal bus of the peripheral device 1. The internal bus allows an information management and storage means 4 to communication with an enciphering means 5 for enciphering confidential information and with an interface 6 between a user and the peripheral device 1. The interface 6 enables, inter alia, the entering of a confidential code for access to the peripheral device.

Figure 2:
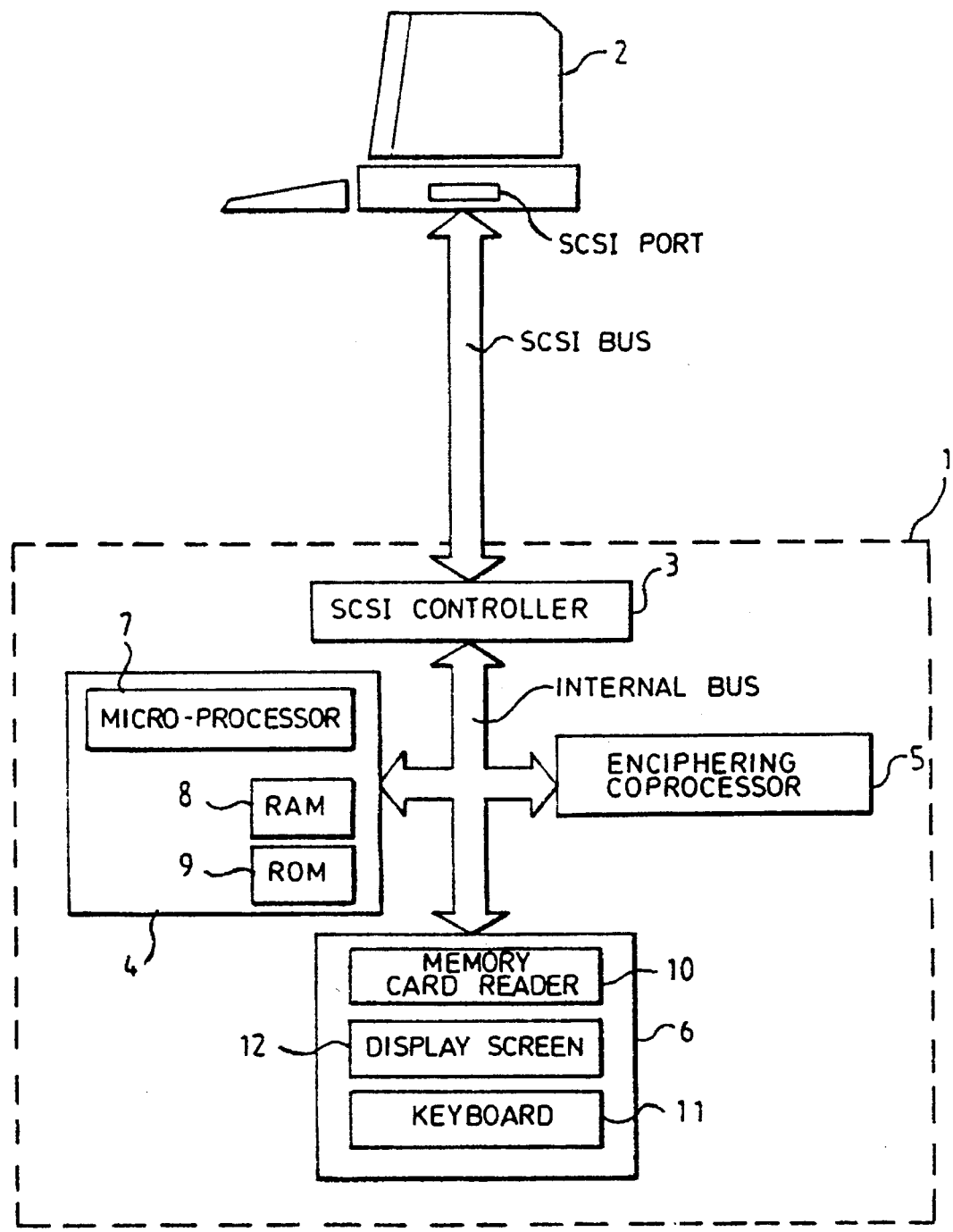
FIG. 2 shows a first embodiment of a device according to the invention.

FIG. 2 shows a first embodiment of a peripheral device according to the invention based on the functional diagram of FIG. 1. In the following figures, elements corresponding to elements of FIG. 1 are designated by the same reference numerals.

The interface 3 between the SCSI bus and the internal bus of the peripheral includes by an SCSI controller that assembles device the above-mentioned functions. The information management and storage means 4 comprises a microprocessor 7, a RAM 8 for the use and temporary saving of the information elements, a programmable ROM 9 containing the application for the management of the information elements at input and output of the microprocessor 7 as well as the information elements coming from the user interface 6. The enciphering means 5 are formed using an enciphering circuit, for example a coprocessor dedicated to the enciphering function. The interface 6 between the user and the peripheral device 1 has a memory card reader 10 containing, for example, one or more secret cipher keys enabling access to the peripheral device 1 and the enciphering coprocessor 6. It also has a simplified keyboard 11, for example, with ten keys, enabling the entry of a code corresponding to the bearer code of the card to check access to the peripheral device 1 and to display screen 12, for example, an LCD screen. Should the check be successful, the peripheral device 1 is activated and then used in a standard way as with any standard SCSI peripheral.

The box or case containing the peripheral device 1 according to the invention may be sheathed for purposes of hardening it, with respect to tempest standards.

The enciphering peripheral device 1 as shown in FIG. 2 is seen by the microcomputer 2 as a standard peripheral identified by a specified logic unit number.

The peripheral device 1 according to the invention thus makes it possible to avoid a software implementation of enciphering within the microcomputer 2. This enciphering is therefore done without modifying the operating system of the microcomputer 2.

One application of the peripheral device 1 according to the invention includes enciphering a file transmitted from the microcomputer 2 to the enciphering peripheral device 1 by means of the SCSI bus. Since the bus is a two-way bus, it transmits information elements in plain form to the peripheral device 1 which, after processing, reintroduces them into the microcomputer 2 in the form of enciphered information elements. The enciphered information elements can then be stored on a magnetic medium such as a disk or a magnetic tape. Conversely, confidential information elements enciphered on a disk or a magnetic tape can be exploited by the microcomputer 2 only after deciphering by the peripheral device 1.

Figure 3:
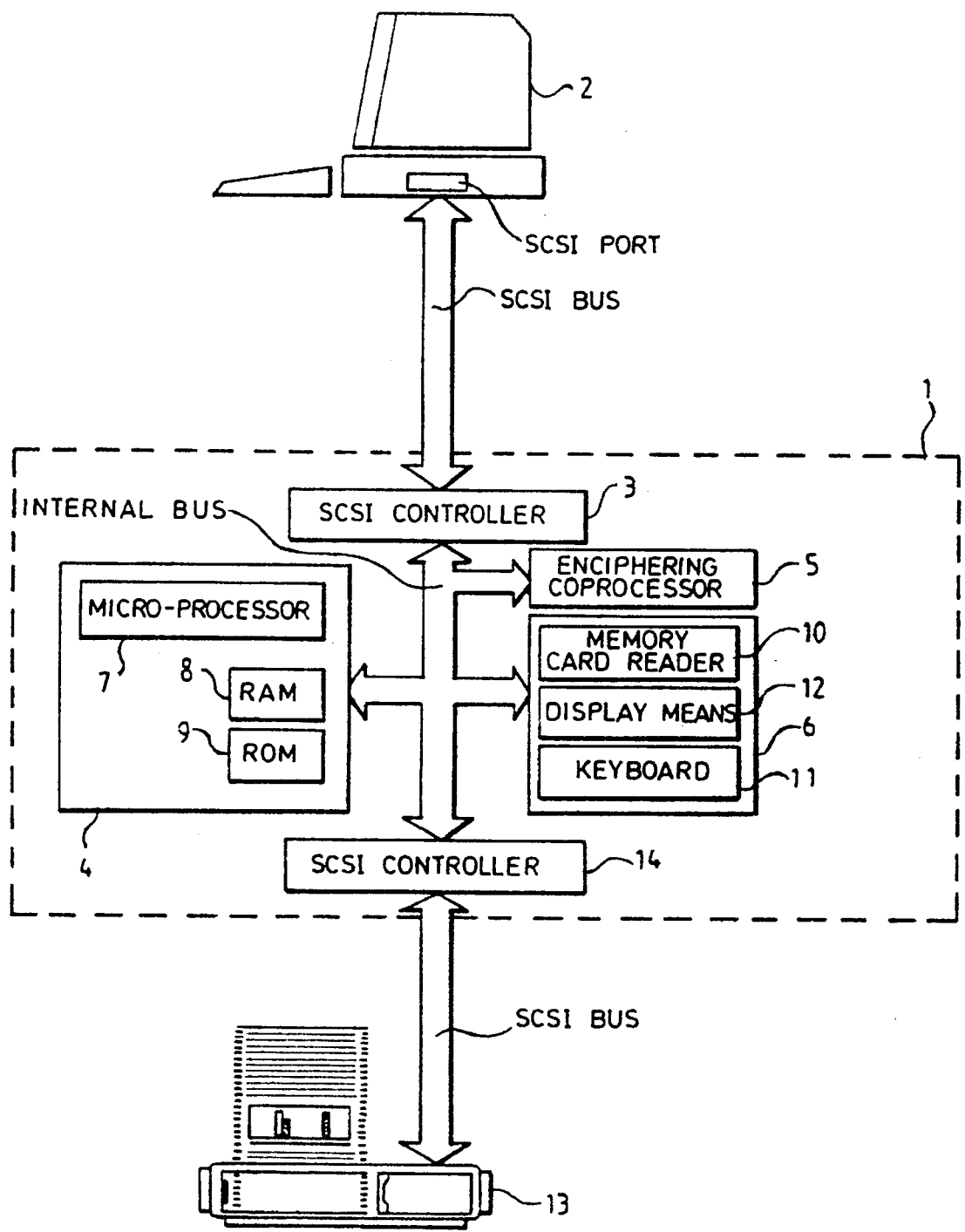
FIG. 3 shows a second embodiment of a device according to the invention.

FIG. 3 shows a second embodiment of a peripheral according to the invention spliced into the SCSI bus between the microcomputer 2 and another SCSI peripheral device 13, for example a scanner, a printer or any other SCSI peripheral device. At output, it has a second SCSI controller 14 interfacing between the internal bus of the peripheral device 1 according to the invention and a second SCSI bus connecting the SCSI peripheral device 13 to the peripheral device 1 according to the invention. The peripheral device 1 according to the invention then acts as an enciphering connector.

Figure 4:
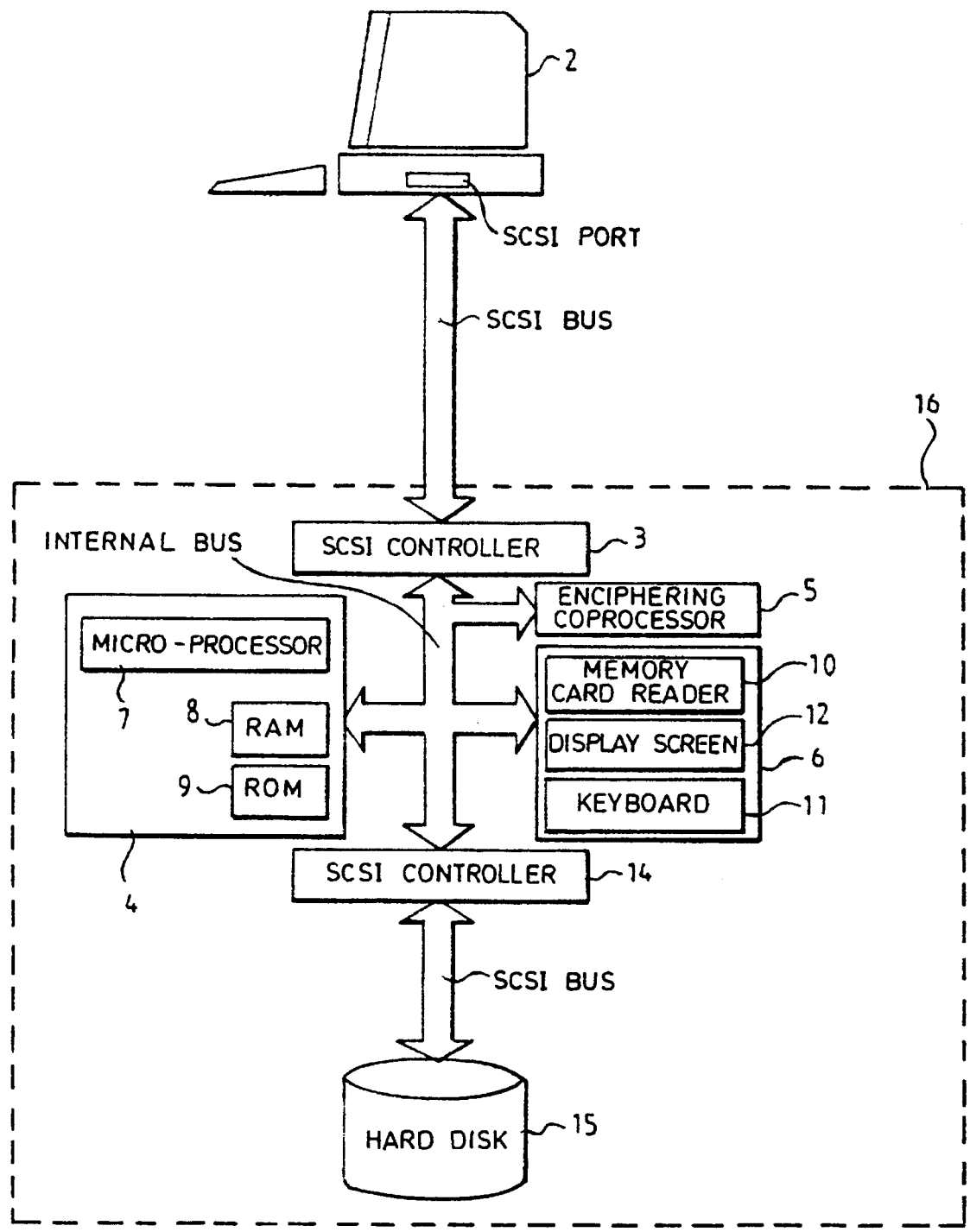
FIG. 4 shows a third embodiment of a device according to the invention.

FIG. 4 illustrates a third embodiment of a peripheral device according to the invention used as an enciphering hard disk containing, for example, all the confidential information elements stored in enciphered form. In this figure, the elements corresponding to elements of FIG. 3 are designated by the same references numerals.

As in the case of the second embodiment of a device according to the invention illustrated in FIG. 3, the peripheral device 1 has the second SCSI controller 14 coupled to a standard hard disk 15 by means of an SCSI bus or any other interface towards a hard disk.

The peripheral device 1 associated with the hard disk 15 may be considered to be new peripheral device 16 demarcated by a closed line of dashes and it may be considered by the microcomputer 2 as two distinct logic units: a first logic unit using the hard disk 15 as a memory of enciphered data elements and a second logic unit using the hard disk 15 as a memory of data elements in non-enciphered or plain form. From the microcomputer 2, it is enough to choose the logic unit number corresponding to one of the two functions to respectively obtain data stored in plain form or data stored in enciphered form organized, for example, in the form of files.

In the different applications described here above, the peripheral devices 1 and 16 furthermore enable checks to be made on the integrity of the confidential information elements exchanged between the peripheral devices 1 and 16 and the microcomputer 2 as well as the authentication of the user.

What is claimed is:

1. A peripheral device for protecting an information system of a microcomputer including at least one SCSI port attached to a first SCSI bus, said peripheral device for enciphering confidential information travelling through the information system, said peripheral device comprising:

a bus internal to the peripheral device;

an interface between the first SCSI bus and the bus internal to the peripheral device;

enciphering means;

information management and storage means for communicating with the enciphering means; and an interface between a user and the peripheral device, whereby the confidential information travels through the peripheral device independent of standards of a bus used by the information system and an operating system used by the information system.

2. A peripheral device as claimed in claim 1, wherein the interface between the first SCSI bus and the bus internal to the peripheral device comprises a first SCSI controller;

wherein the enciphering means comprises a dedicated enciphering coprocessor;

wherein the information management and storage means comprises a microprocessor and a memory block; and wherein the interface between the user and the peripheral device comprises:
 a memory card reader including at least one secret key,
 a display screen, and
 a keyboard enabling an access code of a card to be checked.

3. A peripheral device as claimed in claim 2, further comprising:

a second SCSI controller coupled to the internal bus of the peripheral device and coupled to at least one SCSI peripheral through a second SCSI bus, whereby the peripheral device then acts as an enciphering connector.

4. A peripheral device as claimed in claim 2, further comprising:

a second SCSI controller coupled to the internal bus of the peripheral device and coupled to at least one hard disk through a second SCSI bus, whereby the peripheral device and the at least one hard disk then act as an enciphering hard disk.

5. A peripheral device as claimed in claim 1, further comprising:
a SCSI controller coupled to the internal bus of the peripheral device and coupled to at least one SCSI peripheral through a second SCSI bus, whereby the peripheral device then acts as an enciphering connector.

6. A peripheral device as claimed in claim 1, further comprising:
a SCSI controller coupled to the internal bus of the peripheral device and coupled to at least one hard disk through a second SCSI bus, whereby the peripheral device and the at least one hard disk then act as an enciphering hard disk.

* * * * *